US008358995B2

(12) United States Patent
Patel

(10) Patent No.: US 8,358,995 B2
(45) Date of Patent: Jan. 22, 2013

(54) SYSTEMS AND METHODS FOR SUPPRESSING RADIO INTERFERENCE FROM A NOISE SOURCE VIA ACTIVE FILTERING

(75) Inventor: Vipul M. Patel, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 12/912,925

(22) Filed: Oct. 27, 2010

(65) Prior Publication Data

US 2011/0053515 A1    Mar. 3, 2011

Related U.S. Application Data

(63) Continuation of application No. 12/392,306, filed on Feb. 25, 2009, now Pat. No. 7,848,707, and a continuation-in-part of application No. 11/860,352, filed on Sep. 24, 2007, now abandoned.

(51) Int. Cl.
*H04B 1/10* (2006.01)
(52) U.S. Cl. ...................................... 455/297
(58) Field of Classification Search .................... 455/297
See application file for complete search history.

(56) References Cited

U.S. PATENT DOCUMENTS

| 4,525,870 | A |   | 6/1985 | Fukuhara et al. |         |
|-----------|---|---|--------|-----------------|---------|
| 5,519,889 | A |   | 5/1996 | Hipp            |         |
| 5,857,060 | A |   | 1/1999 | Elliott et al.  |         |
| 5,890,059 | A | * | 3/1999 | Shoemaker et al.| 455/297 |
| 5,903,819 | A |   | 5/1999 | Romesburg       |         |
| 7,020,549 | B2|   | 3/2006 | Nakaya et al.   |         |
| 7,425,781 | B2|   | 9/2008 | Goto et al.     |         |
| 2005/0207585 | A1 | | 9/2005 | Christoph     |         |
| 2006/0226710 | A1 | |10/2006 | Kawasaki et al.|        |
| 2009/0029665 | A1 | | 1/2009 | Pervez et al. |         |
| 2009/0081980 | A1 | | 3/2009 | Patel         |         |
| 2009/0154727 | A1 | | 6/2009 | Patel         |         |

OTHER PUBLICATIONS

Office Action dated Nov. 2, 2010, issued in U.S. Appl. No. 11/860,352.
Comstock, L., et al. "Reduction in Radio Interference Through PWM Frequency Dithering," IEEE International Symposium on EMC, 2006, pp. 615-619, vol. 3.
Office Action dated Jul. 19, 2010, issued in U.S. Appl. No. 11/860,352.
Response to Office Action dated Oct. 7, 2010, filed in U.S. Appl. No. 11/860,352.

(Continued)

*Primary Examiner* — Matthew Anderson
*Assistant Examiner* — David Bilodeau
(74) *Attorney, Agent, or Firm* — Ingrassia Fisher & Lorenz, P.C.

(57) ABSTRACT

Systems and methods are provided for suppressing radio interference from a noise source having an operating frequency. One system includes memory for storing a threshold signal strength, a re-configurable filter for selectively filtering signals of a harmonic of the operating frequency, and a controller. The controller is configured to compare a signal strength of a received signal to the threshold signal strength and turn ON the re-configurable filter if the signal strength of the received signal is less than or equal to the threshold signal strength. A method includes determining a noise signature for the motor vehicle and associating a signal strength threshold with the noise signature. The method further includes comparing a signal strength of a tuned radio station to the signal strength threshold and turning ON the filter if the signal strength is less than or equal to the signal strength threshold.

20 Claims, 4 Drawing Sheets

OTHER PUBLICATIONS

Notice of Allowance dated Jul. 28, 2010, issued in U.S. Appl. No. 12/392,306.

Notice of Allowance, dated Sep. 21, 2012, for U.S. Appl. No. 13/290,645.

* cited by examiner

SYSTEMS AND METHODS FOR SUPPRESSING RADIO INTERFERENCE FROM A NOISE SOURCE VIA ACTIVE FILTERING

CROSS-REFERENCE TO RELATED APPLICATIONS

This application is a continuation of U.S. patent application Ser. No. 12/392,306 filed on Feb. 25, 2009, which is a continuation-in-part of U.S. patent application Ser. No. 11/860,352 filed on Sep. 24, 2007.

TECHNICAL FIELD

The present invention generally relates to radios, and more particularly relates to actively filtering noise source interference from motor vehicle radios.

BACKGROUND OF THE INVENTION

Many motor vehicles employ switching power supplies that utilize pulse width modulation to convert the stock vehicle voltage (usually 12 volts) from the vehicle power supply to whatever particular voltage levels are required to run the various electronic modules connected to the power supplies. The switching power supplies operate by selectively switching electronic devices ON and OFF at a certain operating frequency to generate a switched voltage. The output voltage from such power supplies is determined by the duty cycle of the switched voltage.

In a hybrid motor vehicle, for example, the switching power supply for the electric motor of the powertrain often operates at low frequencies (e.g., frequencies less than 10 kilohertz (kHz)). These low frequencies are chosen based on considerations such as efficiency of operation, heating, and the like. However, the harmonics (i.e., whole-number multiples of the operating frequencies) generated by the switching power supply may still cause interference with some of the vehicle's electronic modules (e.g., a radio).

The amplitude modulation (AM) band of automotive radios is particularly susceptible to interference from a switching power supply because AM radios have a 10 kHz resolution (i.e., they are calibrated to tune in stations in increments of 10 kHz). Specifically, AM band radio interference is experienced whenever a power supply harmonic is within plus or minus 5 kHz of the tuned frequency of the radio. Because the AM frequency band extends from 520 kHz to 1710 kHz in 10 kHz increments, the harmonics of a switching power supply operating at a low frequency may cause interference at certain AM band frequencies. For example, a switching power supply operating at 6 kHz may cause interference at 600 kHz (i.e., the power supply's hundredth harmonic), 900 kHz (i.e., the one hundred fiftieth harmonic), 1100 kHz (i.e., the two hundredth harmonic), and so forth.

Accordingly, it is desirable to provide apparatus, systems, and methods for suppressing radio band interference that overcomes the interference problems attendant with conventional motor vehicle radios. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A radio having reduced interference from a noise source including an operating frequency is provided. One radio comprises a memory configured to store a threshold signal strength, a re-configurable filter adapted to selectively filter radio signals of a harmonic of the operating frequency, and a controller coupled to the memory and the re-configurable filter. The controller is configured to compare a signal strength of a received signal to the threshold signal strength, and turn ON the re-configurable filter if the signal strength of the received signal is less than or equal to the threshold signal strength.

Systems for suppressing AM band radio interference in a radio of a motor vehicle are also provided. An electric motor having an operating frequency, a memory configured to store a threshold signal strength, a re-configurable filter adapted to selectively filter radio signals of a harmonic of the operating frequency, and a controller coupled to the memory and the re-configurable filter. The controller is configured to compare a signal strength of a received signal to the threshold signal strength, and turn ON the re-configurable filter if the signal strength of the received signal is less than or equal to the threshold signal strength.

Methods are also provided for suppressing interference from a noise source having an operating frequency in a motor vehicle including a radio with a re-configurable filter configured to filter signals of a harmonic of the operating frequency. One method comprises the steps of determining a noise signature for the motor vehicle and associating a signal strength threshold with the noise signature. The method further comprises the steps of comparing a signal strength of a tuned radio station to the signal strength threshold and turning ON the filter if the signal strength is less than or equal to the signal strength threshold.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
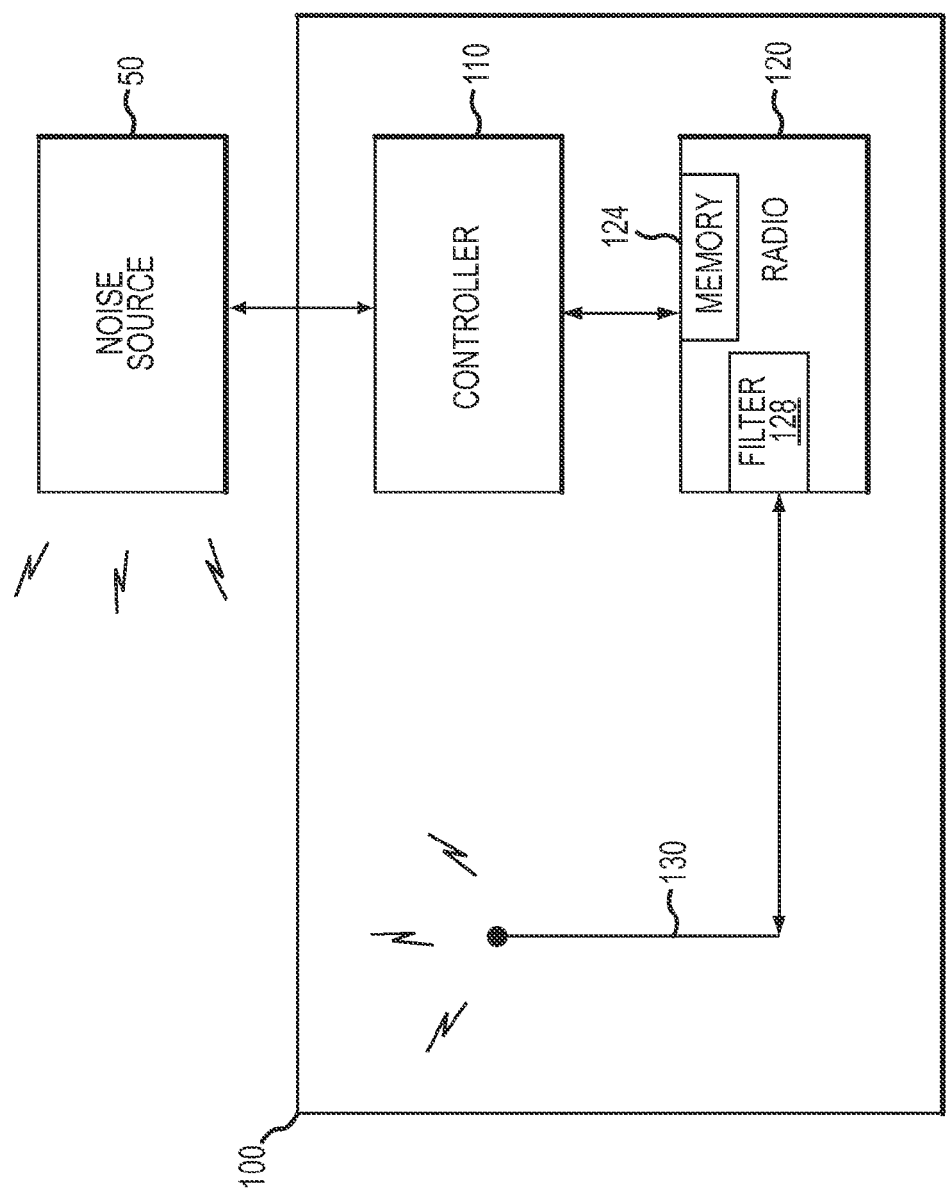
FIG. 1 is a block diagram of one embodiment of a system for suppressing radio interference from a noise source.

FIG. 1 is a block diagram of one exemplary embodiment of a system 100 for suppressing radio interference from a noise source 50. At least in the embodiment illustrated in FIG. 1, system 100 comprises a controller 110 capable of being coupled to noise source 50, a radio 120 coupled to controller 110, and an antenna 130 coupled to radio 120.

Controller 110 may be any device and/or hardware capable of comparing the strength of a radio signal received by radio 120 and a pre-determined threshold signal strength, and commanding a filter (e.g., filter 128, discussed below) to begin filtering signals if the strength of the radio signal is less than or equal to the pre-determined threshold. In addition, controller 110 may be configured to determine if the operating frequency of noise source 50 includes one or more harmonics within the pass band of a tuned radio station, and command filter 128 to begin filtering the harmonic(s) that are within the pass band of the tuned radio station. Controller 110 may be further configured to command noise source 50 to operate at one or more frequencies and command filter 128 to begin filtering the harmonic(s) of the one or more frequencies that are within the pass band of the tuned radio station.

In one embodiment, controller 110 is configured to dither the operating frequency of noise source 50 such that noise source 50 operates at a plurality of operating frequencies. For example, if noise source 50 typically operates a 5 kHz, controller 110 is configured to command noise source 50 to operate at various frequencies within plus or minus about 1 kHz of its typical operating frequency, although other frequency ranges are contemplated. Specifically, controller 110 may dither the operating frequency of noise source 50 so that noise source 50 operates at, for example, 5.0 kHz, 5.5 kHz, 4.3 kHz, 6.0 kHz, etc. during a particular period of time.

In accordance with one embodiment, controller 110 randomly dithers the operating frequency of noise source 50. That is, controller 110 commands noise source 50 to randomly operate at various frequencies between, for example, 4.0 kHz and 6.0 kHz. In another exemplary embodiment, controller 110 dithers the operating frequency of noise source 50 in a repeated pattern. For example, controller 110 may command noise source to repeatedly operate at frequencies of 4.0 kHz, 5.0 kHz, and 6.0 kHz during a particular period of time. That is, the 4.0 kHz, 5.0 kHz, and 6.0 kHz is continually repeated throughout the time period.

Controller 110 is also configured to transmit the various operating frequencies of noise source 50 to radio 120 as controller 110 commands noise source 50 to do such. Specifically, while controller 110 is dithering the operating frequency of noise source 50, controller 110 is also transmitting each of the dithered frequencies to radio 120.

Radio 120 may be any device and/or hardware capable of receiving and demodulating radio signals. In one embodiment, radio 120 is an amplitude modulated (AM) radio.

At least in the illustrated embodiment, radio 120 comprises a memory 124 and filter 128 coupled to memory 124. Memory 124 may be any device and/or system capable of storing data. In one embodiment, memory 124 is configured to store a noise profile of one or more vehicles (see e.g., FIG. 2) within which radio 120 may be operational. Specifically, the noise profile stored in memory 124 is representative of the noise generated by the vehicle within which radio 120 may be located. Furthermore, the noise profile may be associated with the threshold signal strength, which may include an additional margin so that filter 128 may begin filtering the noise generated by noise source 50 when the signal strength of desired signals received by radio 120 have a signal strength close to the noise profile of the vehicle.

Filter 128 may be any device, hardware, and/or software configurable to filter a range of signals having a plurality of frequencies. That is, filter 128 is a filter capable of being re-configured to filter signals having a variety of frequencies. In accordance with one exemplary embodiment of the invention, filter 128 is a digital filter configured to filter signals audible to a human (e.g., signals having a frequency of about 20 Hz to about 20 kHz). For example, filter 128 may be an intermediate frequency digital signal processor (I/F DSP), a comb filter, a notch filter, and/or the like filter.

During operation, controller 110 compares the signal strength of the tuned radio station to the threshold signal strength (i.e., the noise profile of the vehicle or the noise profile of the vehicle plus a marginal amount). If the signal strength of the tuned radio station is greater than the threshold signal strength, filter 128 is turned OFF or remains OFF, and the harmonics of the signals generated by noise source 50 are not filtered by filter 128. If the signal strength of the tuned radio station is less than or equal to the threshold signal strength, controller 110 is configured to determine if one or more harmonics of noise source 50 is within the pass band of the tuned radio station of radio 120. If the harmonics of noise source 50 are outside the pass band of the tuned radio station of radio 120, filter 128 is turned OFF or remains OFF, and the harmonics of the signals generated by noise source 50 are not filtered by filter 128. If one or more harmonics of noise source 50 is within the pass band of the tuned radio station of radio 120 and the signal strength of the tuned radio station is less than or equal to the threshold signal strength, filter 128 remains ON or is turned ON, and the one or more harmonics within the pass band of the tuned station is/are filtered by filter 128.

In another embodiment, when the signal strength of the tuned radio station is less than or equal to the threshold signal strength, controller 110 begins dithering the operating frequency of noise source 50. While controller 110 dithers the operating frequency of noise source 50, controller 110 notifies filter 128 of the various operating frequencies of noise source 50. Controller 110 also determines if one or more harmonics of each dithered frequency is within the pass band of the tuned radio station.

If the harmonics of a dithered frequency are outside the pass band of the tuned radio station of radio 120, filter 128 is turned OFF or remains OFF, and the harmonics of that particular dithered frequency are not filtered by filter 128. If one or more harmonics of a dithered frequency is within the pass band of the tuned radio station of radio 120 and the signal strength of the tuned radio station is less than or equal to the threshold signal strength, filter 128 remains ON or is turned ON, and the one or more harmonics within the pass band of the tuned station is/are filtered by filter 128.

Notably, one or more of the dithered frequencies may include one or more harmonics within the pass band of the tuned radio station that need to be filtered, while one or more of the dithered frequencies does not include a harmonic that is within the pass band of the tuned radio station, in which no filtering occurs. In this situation, filter 128 will be turned ON as needed to filter the harmonic(s) of each dithered operating frequency when the harmonic(s) is/are within the pass band of the tuned radio station and the signal strength of the tuned radio station is less than or equal to the threshold signal strength.

The following example may be helpful in better understanding this embodiment. If noise source 50 is commanded to dither its operating frequency at 2.0 kHz, 2.5 kHz, and 3.0 kHz, controller 110 is configured to recognize that the 2.0 kHz signal has harmonics at 4.0 kHz, 6.0 kHz, 8.0 kHz, 10.0 kHz, etc. Controller 110 will also recognize that the 2.5 kHz signal has harmonics at 5.0 kHz, 7.5 kHz, 10.0 kHz, etc., and the 3.0 kHz signal has harmonics at 6.0 kHz, 9.0 kHz, 12.0 kHz, etc. As a result, controller 110 is configured to determine if one or more of the harmonics of the 2.0 kHz, 2.5 kHz, and/or 3.0 kHz operating frequencies is within the pass band of the tuned station and, if so, controller 110 is configured to command filter 128 to filter the harmonic(s) that is/are within the pass band of the tuned radio station.

By dithering the operating frequency of noise source 50 and having filter 128 filter signals of a frequency corresponding to the harmonics of the operating frequency, signals received by radio 120 that would otherwise cause interference in radio 120 are not allowed to pass. Furthermore, because the harmonics of the signals change due to dithering, users of radio 120 are substantially unable to detect that various tones in desired signals that correspond to a particular frequency are being filtered.

Figure 2:
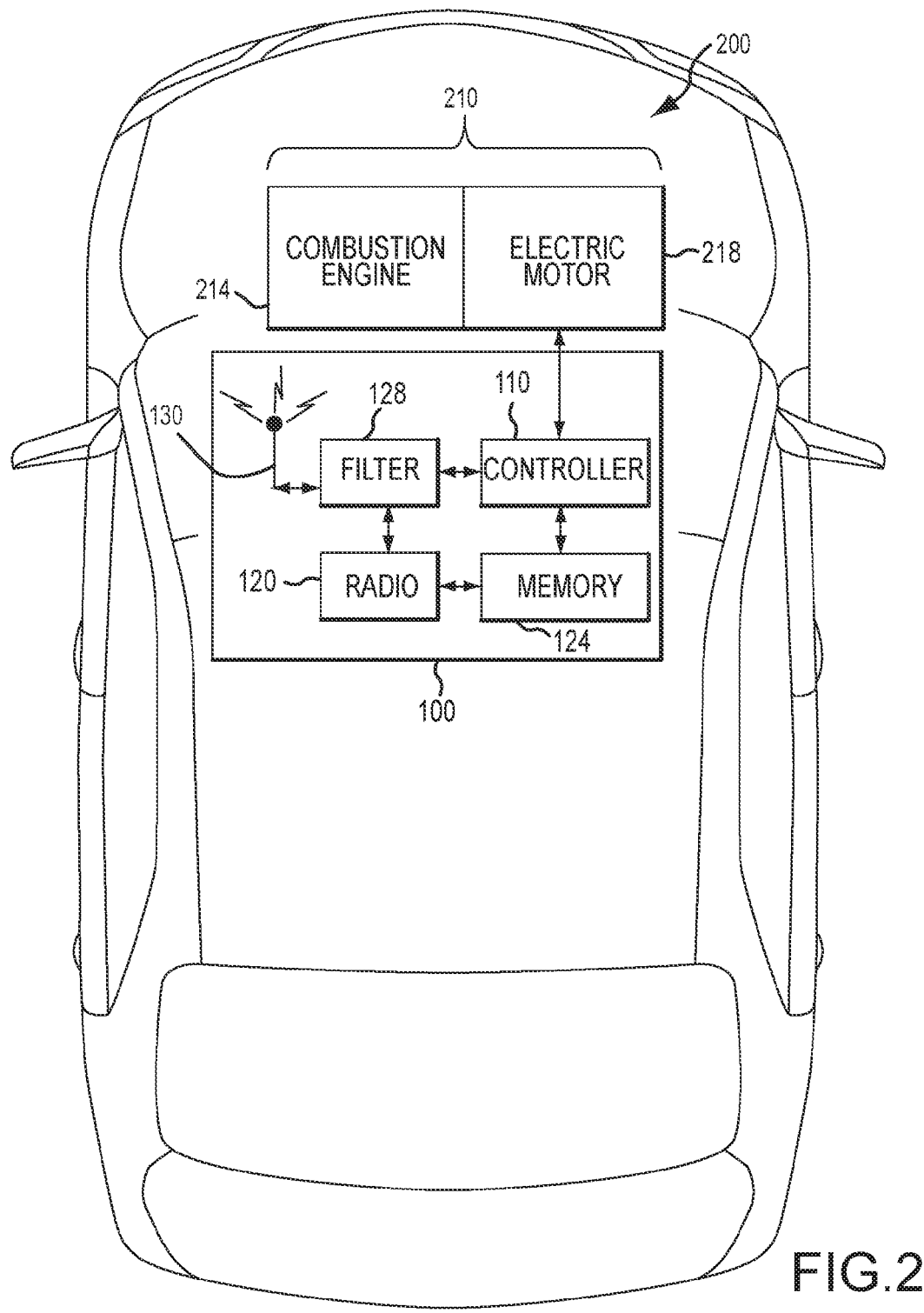
FIG. 2 is schematic diagram of the system of FIG. 1 implemented in an exemplary motor vehicle.

FIG. 2 is a schematic diagram of system 100 implemented in a motor vehicle 200 comprising a powertrain 210. As illustrated, powertrain 210 is a hybrid motor comprised of a combustion engine 214 and an electric motor 218, although powertrain 210 may only include electric motor 218 or another type of noise-generating motor.

In motor vehicle 200, powertrain 210, and particularly electric motor 218, is a noise source similar to noise source 50 in FIG. 1. Accordingly, if the signal strength of the tuned radio station is less than or equal to the threshold signal strength, filter 128 begins to filter the noise signals generated by electric motor 218. Specifically, filter 128 either filters the relevant harmonics of electric motor 218 or is notified by controller 110 to begin filtering the relevant harmonics of the dithered operating frequency of electric motor 218, depending upon which configuration of system 100 is included within motor vehicle 200. If the latter configuration of system 100 is implemented in motor vehicle 200, controller 110 begins to dither the operating frequency of powertrain 210 (i.e., electric motor 218) and communicates the various operating frequencies of electric motor 218 to filter 128 so that filter 128 can filter the harmonics of the current operating frequency of electric motor 218 that would otherwise interfere with the tuned radio station. Specifically, as the operating frequency of electric motor 218 changes (i.e., is dithered), filter 128 likewise changes the frequencies of the signals it filters so that filter 128 is able to filter the harmonic(s) that is/are within the pass band of the tuned radio station.

As illustrated in FIG. 2, filter 128 may be external to radio 120. That is, filter 128 may be part of radio 120 (see FIG. 1), or may be a separate component (see FIG. 2). In either configuration, filter 128 is in communication with controller 110, antenna 130, and radio 120.

Figure 3:
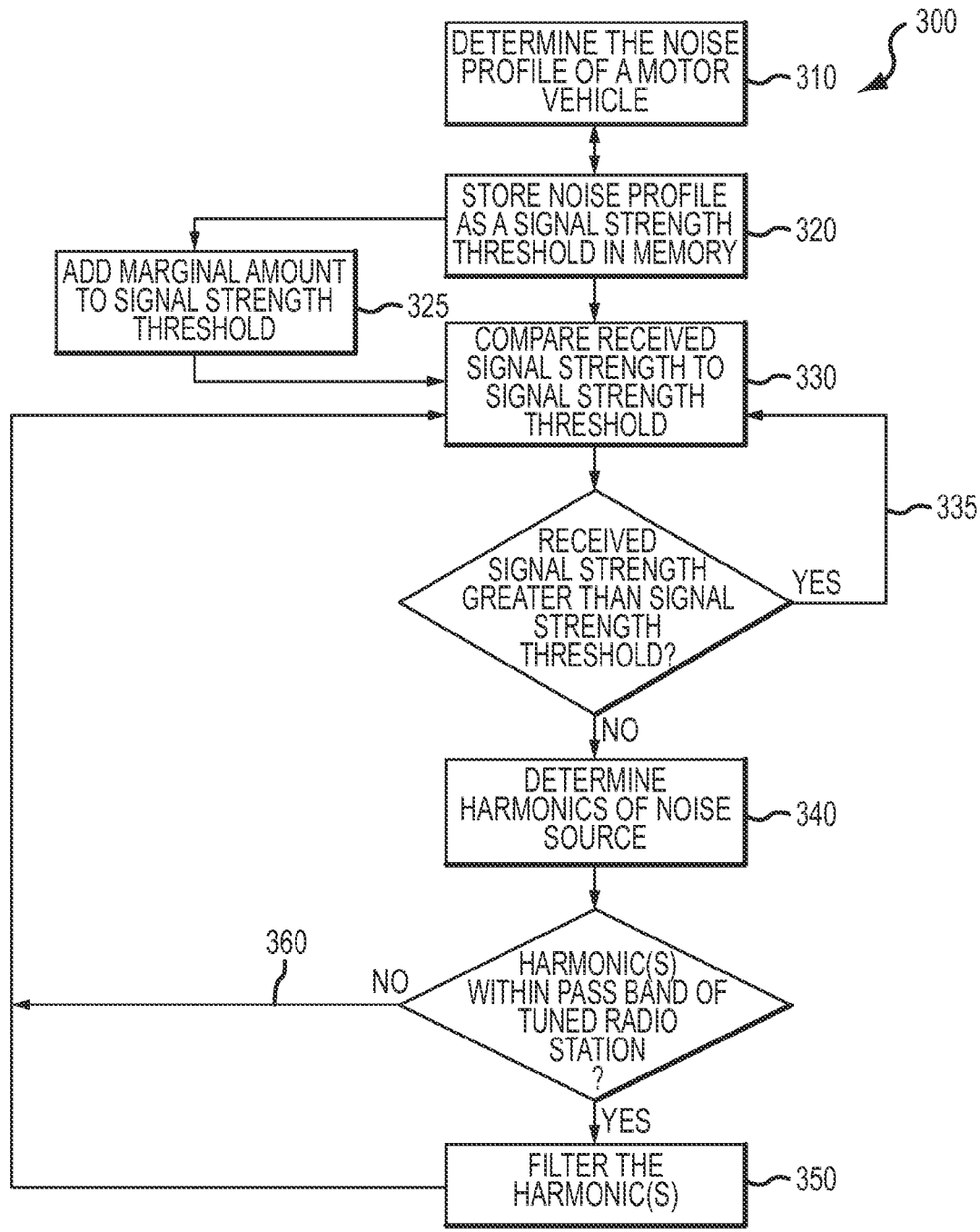
FIG. 3 is a flow diagram of one embodiment of a method for suppressing radio interference from a noise source.

FIG. 3 is a flow diagram of one exemplary embodiment of a method 300 for suppressing interference from a noise source (e.g., noise source 50, powertrain 210, electric motor 218, and the like). Method 300 begins by determining the noise profile of a motor vehicle (e.g., motor vehicle 200) in which a radio (e.g., radio 120) is to be located (step 310). The noise profile of the motor vehicle is determined by, for example, the noise generated by the electric motor, the noise generated by the wiring, the location of the antenna, the body type, and the like characteristics of the motor vehicle.

The noise profile is stored in memory (e.g., memory 124) within the radio as a threshold signal strength (step 320). Optionally, a marginal amount may be added to the threshold signal strength (step 325).

As the radio receives signals from a tuned radio station, the radio compares the signal strength of the signals from the tuned radio station to the threshold signal strength or the threshold signal strength plus the marginal amount (step 330). If the signal strength of the tuned radio station is greater than the threshold signal strength or the threshold signal strength plus the marginal amount, the radio continues to compare the signal strength of the signals from the tuned radio station to the threshold signal strength or the threshold signal strength plus the marginal amount (step 335).

If the signal strength of the tuned radio station is less than or equal to the threshold signal strength or the threshold signal strength plus the marginal amount, the radio determines if one or more harmonics of the operating frequency of the noise source is within the pass band of the tuned radio station (step 340). If one or more harmonics of the noise source is within the pass band of the tuned radio station, the radio filters the one or more harmonics via, for example, a filter (e.g., filter 128) (step 350). If the harmonics of the noise source are outside of the pass band of the tuned radio station, the radio continues to compare the signal strength of the signals from the tuned radio station to the threshold signal strength or the threshold signal strength plus the marginal amount (step 360).

Figure 4:
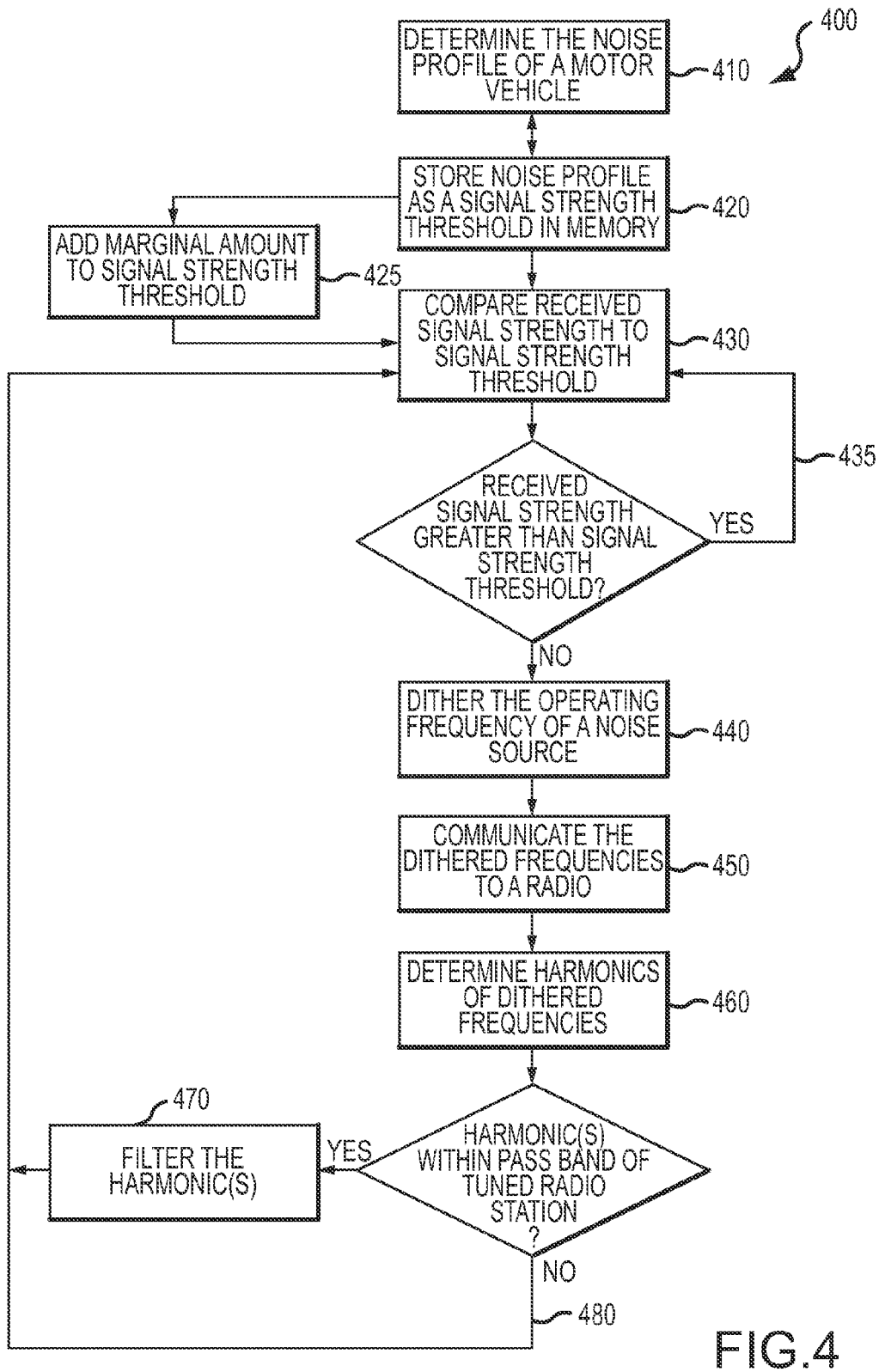
FIG. 4 is a flow diagram of another embodiment of a method for suppressing radio interference from a noise source.

FIG. 4 is a flow diagram of another embodiment of a method 400 for suppressing interference from a noise source (e.g., noise source 50, powertrain 210, electric motor 218, and the like). Method 400 begins by determining the noise profile of a motor vehicle (e.g., motor vehicle 200) in which a radio (e.g., radio 120) is to be located (step 410). The noise profile of the motor vehicle is determined by, for example, the noise generated by the electric motor, the noise generated by the wiring, the location of the antenna, the body type, and the like characteristics of the motor vehicle.

The noise profile is stored in memory (e.g., memory 124) within the radio as a threshold signal strength (step 420). Optionally, a marginal amount may be added to the threshold signal strength (step 425).

As the radio receives signals from a tuned radio station, the radio compares the signal strength of the signals from the tuned radio station to the threshold signal strength or the threshold signal strength plus the marginal amount (step 430). If the signal strength of the tuned radio station is greater than the threshold signal strength or the threshold signal strength plus the marginal amount, the radio continues to compare the signal strength of the signals from the tuned radio station to the threshold signal strength or the threshold signal strength plus the marginal amount (step 435).

If the signal strength of the tuned radio station is less than or equal to the threshold signal strength or the threshold signal strength plus the marginal amount, the radio commands a controller (e.g., controller 110) to begin dithering the operating frequency of the noise source (step 440). In one embodiment, the operating frequency is less than about 10.0 kHz and the controller may dither the operating frequency of the noise source in a repeating pattern or may dither the operating frequency randomly.

The various operating frequencies of the noise source are communicated to a radio (e.g., radio 120) as the operating frequency of the noise source is being dithered (i.e., changed) (step 450). The radio 120 then determines the harmonics for the various operating frequencies of the noise source (step 460).

If one or more harmonics of the dithered frequencies is within the pass band of the tuned radio station, the radio filters signals having the same frequency as the one or more harmonics via, for example, a filter (e.g., filter 128) (step 470). If the harmonics of the dithered frequencies are outside of the pass band of the tuned radio station, the radio continues to compare the signal strength of the signals from the tuned radio station to the threshold signal strength or the threshold signal strength plus the marginal amount (step 480).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A radio in a motor vehicle having reduced interference from a noise source including an operating frequency, comprising:
    a controller coupled to the noise source, configured to determine a threshold signal strength corresponding to a noise profile of the motor vehicle to be coupled to the noise source and to command the noise source to dither the operating frequency if a received signal strength received by said radio is less than said threshold signal strength; and
    a filter coupled to the controller and adapted to receive radio signals, the filter configured to receive signals from the controller indicating a present operating frequency of the noise source and to filter radio signals having the same frequency as the present operating frequency while the operating frequency is dithered.

2. The radio of claim 1, wherein the filter is a re-configurable filter adapted to selectively filter radio signals of a harmonic of the operating frequency.

3. The radio of claim 1, wherein the filter is a re-configurable filter adapted to selectively filter the radio signals having the same frequency as the present operating frequency as the operating frequency is dithered.

4. The radio of claim 1, wherein the radio comprises a digital signal processor to filter the radio signals having the same frequency as the present operating frequency as the operating frequency is dithered.

5. The radio of claim 1, wherein the controller is further configured to command the noise source to randomly dither the operating frequency.

6. The radio of claim 1, wherein the controller is further configured to command the noise source to dither the operating frequency in a pre-determined pattern.

7. The radio of claim 1, wherein the operating frequency is less than 10 kHz.

8. The radio of claim 7, wherein each of the dithered operating frequencies is less than 1 kHz from the operating frequency.

9. A system for suppressing radio interference in a radio in a motor vehicle, comprising:
    an electric motor having an operating frequency;
    a memory configured to store a threshold signal strength corresponding to a noise profile of the motor vehicle;
    a controller coupled to the electric motor and configured to command the electric motor to dither the operating frequency if a received signal strength received by said radio is less than said threshold signal strength; and
    a filter coupled to the controller, the filter configured to receive signals from the controller indicating a present operating frequency of the electric motor and to filter radio signals having the same frequency as the present operating frequency while the operating frequency is dithered.

10. The system of claim 9, wherein the radio comprises a re-configurable filter adapted to selectively filter the received signals having the same frequency as the present operating frequency as the operating frequency is dithered.

11. The system of claim 9, wherein the radio comprises a digital signal processor for filtering the received signals having the same frequency as the present operating frequency as the operating frequency is dithered.

12. The system of claim 9, wherein the radio comprises a re-configurable filter adapted to selectively filter signals having the same frequency as a harmonic of the present operating frequency.

13. The system of claim 9, wherein the radio comprises a notch filter for filtering the received signals having the same frequency as the present operating frequency as the operating frequency is dithered.

14. The system of claim 9, wherein the electric motor is a powertrain motor.

15. The radio of claim 9, wherein the controller is further configured to command the electric motor to randomly dither the operating frequency.

16. The radio of claim 9, wherein the controller is further configured to command the electric motor to dither the operating frequency in a pre-determined pattern.

17. A method for suppressing interference from a noise source of a motor vehicle having an operating frequency, in a radio of the motor vehicle comprising a digital filter, the method comprising:
    determining a threshold signal strength corresponding to a noise profile of the noise source of the motor vehicle;
    dithering the operating frequency of the noise source if a received signal strength of the radio is less than said threshold signal strength; and
    filtering the radio signals having the same frequency as the operating frequency while the operating frequency is dithered.

18. The method of claim 17, further comprising communicating the operating frequency to the radio as the operating frequency is dithered.

19. The method of claim 17, wherein the dithering further comprises one of randomly dithering the operating frequency and dithering the operating frequency in a pre-determined pattern.

20. The method of claim 17, further comprising filtering signals having the same frequency as a harmonic of the operating frequency.

* * * * *